May 5, 1964
D. H. BRESLOW
3,132,332
SIGNAL FAILURE DETECTING SYSTEM
Filed Dec. 17, 1959
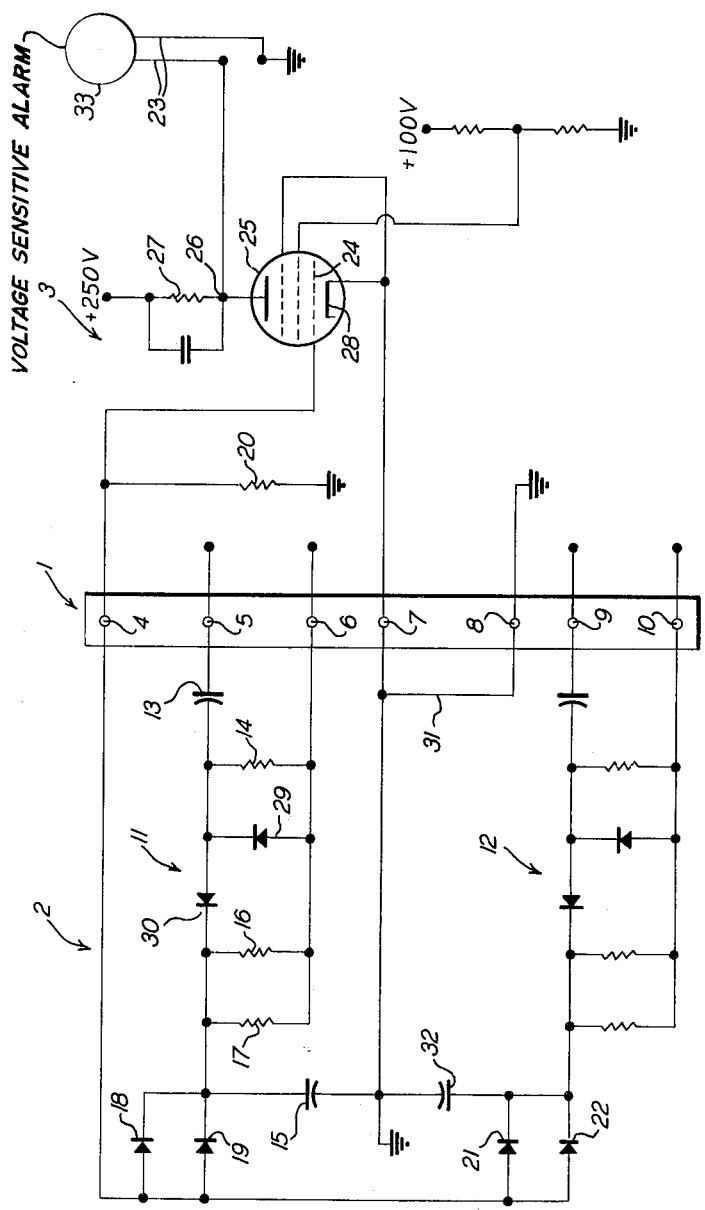
INVENTOR
DONALD H. BRESLOW
BY *H. Vincent Harsha*
ATTORNEY

United States Patent Office 3,132,332
Patented May 5, 1964

3,132,332
SIGNAL FAILURE DETECTING SYSTEM
Donald H. Breslow, Saxonville, Mass., assignor to Raytheon Company, Lexington, Mass., a corporation of Delaware
Filed Dec. 17, 1959, Ser. No. 860,194
13 Claims. (Cl. 340—248)

This invention relates generally to comparator networks for monitoring wave forms and more particularly to a network to provide an output to an alarm system for one or more signal inputs whereby an indication may be given that the amplitude of a signal has fallen below a certain preset level.

In the past, designers of monitoring test equipment have concentrated on sampling critical wave forms with, for example, rotary devices, such as stepping switches. This equipment is bulky, noisy, and the monitoring is not continuous in nature depending on the speed of sampling and the number of wave forms to be sampled. Also in a sampling scheme, the order of sampling is quite critical, and in certain types of signal flow through modules, it is possible to get false readings. However, by the use of a continuous monitor, as with the comparator network of this invention, the presence of a continuous unsampled output signal greatly simplifies the alarm circuits and virtually eliminates the possibility of false alarms. In a sampling type scheme, all of the wave forms to be sampled are brought to the sampler, which means a large number of interconnections. However, by the use of comparators the interconnection problem is considerably reduced as will be apparent to one skilled in the art upon the understanding of the following specification.

The primary object of this invention is to provide a simple comparator network into which one or more input signals may be fed to a common output to an alarm system for indicating whether or not the performance level of any one of the signals has fallen below a preset level.

A more specific object of this invention is to provide a simple, miniaturized plug-in comparator network for receiving one or more input signals which are channelized in the network to a single output operative when energized to actuate an alarm indicating a drop in level of one of said input signals.

Another object of this invention is to provide a comparator network wherein one or more input electrical signals from diverse electronic equipment may be fed to a common output for connection to an alarm system to indicate instantaneously the failure or malfunction of any input signal to maintain a preset level.

A still further object of this invention is to provide an improved comparator network for plural input signals, whereby each separate input signal is compared with a particular reference voltage and is subsequently connected with an output point in the comparator network along with the output from channelized other input signals whereby the output terminal of the network will be placed under such a potential as to actuate an alarm connected thereto when any input signal deviates more than a preselected amount from an oppositely applied negative reference voltage.

A more specific object of this invention is to provide a comparator network for plural input signals whereby independent peak detection portions of the comparator network will function independently of each other to individually place a potential on an output terminal of the network, sufficient to energize an alarm system, upon a deviation of the input signal below a certain preset amount.

Another object of this invention is to provide a comparator network for one or more input signals whereby a fail safe alarm system will function to indicate malfunction of equipment attached to the network practically instantaneously upon deviation or drop of the peak of an input signal wave form below a preset level.

A further object of this invention is to provide a comparator network for input signals to act as a fail safe monitoring system whereby the network requires almost zero power consumption and does not load down circuits.

A further object is to provide a comparator network which is flexible in nature in that it is adaptable to a wide variety of wave form monitoring or a wide range of repetition frequencies.

A further object of this invention is to provide a comparator network which may be connected to equipment under test or monitoring conditions which will function during operating conditions of the equipment being tested.

With the foregoing and other objects in mind, the invention resides in the following specification and appended claims, certain embodiments thereof being illustrated in the accompanying drawing in which the figure is a schematic diagram of the circuit layout of the comparator network coupled by a suitable jack board to an amplifier arrangement for actuating an alarm signal system.

Referring now more particularly to the drawing, the invention includes a jack or plug-in type board 1 to which is connected a comparator network generally indicated by the reference character 2. The jack board is further connected to an amplifier system generally indicated by reference character 3. As illustrated, the jack board 1 includes a plurality of terminals 4, 5, 6, 7, 8, 9 and 10. The amount of terminals provided on the board 1 depends on how many input signals are to be monitored by the comparator network. As illustrated, the comparator network 2 includes basically two channels indicated by the reference characters 11 and 12 which are substantially identical in character. The terminal 4 on the board 1 constitutes a common output for the channels 11 and 12 of the network. Terminal 5 constitutes an input terminal for the first signal to be monitored. Terminal 6 constitutes an input terminal for a reference voltage of a preselected value from an external source to be applied in opposition to the input signal applied at terminal 5. Terminal 7 constitutes a grounded terminal as does terminal 8. Terminal 9 is a terminal for receiving a second input signal from a different electronic device or from a different circuit of the same electronic device under test. Terminal 10 is utilized to receive from an external source a preselected reference voltage in opposition with respect to the input voltage at terminal 9.

Since channels 11 and 12 are identical in character, differing only in the input signal and the reference voltage levels applied thereto, only one channel will be described in detail. Therefore, referring to channel 11, it will be assumed that a signal to be compared or monitored is applied at terminal 5 and is A.C. coupled into the network through condenser 13 and resistor 14. Diode 29 is a D.C. restorer to restore the level of the A.C. coupled input to the value of the negative reference voltage applied at the terminal 6. The restored signal charges a condenser 15 through another diode 30. The time constant of condenser 15 and paralleled resistors 16 and 17, which constitute the discharge path for condenser 15, is much greater than the period of the input signal so that the voltage across condenser 15, due to the input signal, is a relatively good measure of the peak value of such signal. The voltage across condenser 15 represents the comparison or difference of the peak amplitude of the input and the magnitude of the negative reference voltage. If the peak amplitude of the input signal is greater than the magnitude of the reference, then condenser 15 will be charged positively with respect to ground; if the peak amplitude of the input signal should be less than the magnitude of the negative reference voltage, then condenser 15 will be charged negatively with respect to ground.

The output terminal 4 is normally terminated in a relatively high impedance to ground. When condenser 15 is charged positively with respect to ground, a pair of parallel diodes 18 and 19 are back biased, and the output at terminal 4 is grounded through resistance 20, which may be of the order of one megohm. Should condenser 15 not be charged above ground, as would be caused by a decrease in the amplitude of the input signal, then the diodes 18 and 19 would be forward biased. They conduct through the path of the terminating resistor and parallel resistors 16 and 17, and the output at terminal 4 falls below ground by an amount proportional to the difference between the input signal peak amplitude and the magnitude of the reference voltage.

It can be seen that the output at terminal 4 has two principal states. One state is at ground and corresponds to normal operation of the monitored circuits. A second state is below ground and corresponds to a malfunction or performance deterioration of the system from which the input signal is derived. A typical fail level may be on the order of one volt negative or greater. Regardless of the amplitude or shape of the wave form that is compared, or the level at which the input signal is judged to cause malfunction, the output of the comparator is zero volts for normal operation and minus one volt, or a similar preselected amount, for malfunction of the system. The effect of this device is to normalize any input so that the output state is at either of two predetermined levels. The normalizing is accomplished by supplying a suitable negative reference voltage having a wave form in opposition to each input wave form and by D.C. restoring each input signal to the reference level. In order that the output at the terminal 4 be at ground, condenser 15 must be charged positively, regardless of the input wave, shape and amplitude. The setting of the reference voltage at terminal 6 establishes the level from which condenser 15 is charged. By setting this level external to the device, all wave forms can provide the same normalized output level of zero and minus one volt.

The network 2 is a dual channel network including channels 11 and 12. To this point in the description of the network 2 only channel 11 has been described. Channel 12 operates exactly as does channel 11. Channel 12 is connected with terminal 9 representing the terminal to which a second input signal is applied to the jack board 1 and is further connected to the terminal 10 to which a second negative reference voltage is applied. The two peak detector normalizing channels 11 and 12 operate completely independently of each other. However, the operation of the output circuit is not completely independent. The voltage across condenser 15 to ground represents a comparison of the peak amplitude of the input at terminal 5 and the magnitude of the reference at terminal 6; the voltage across condenser 32 to ground represents the comparison of the input signal at terminal 9 and the reference voltage at the terminal 10. The comparison voltage of channel 11 is coupled to the output at terminal 4 through parallel diodes 18 and 19; the comparison voltage of channel 12 is coupled to the output terminal 4 through parallel diodes 21 and 22. It can be seen that the diode combinations 18—19 and 21—22 together with the terminating resistor 20 form what is known as the "AND" coincidence circuit. Both sets of diodes must be back biased for the output to be at zero volts. Should either pair of diodes be allowed to conduct in the forward direction, as would be caused by a reduction in amplitude of either input signal, then the output at terminal 4 will be negative.

When only one signal is to be monitored, either channel of the device may be used since they are identical. Both channels are used when two signals are to be monitored. If three or more signals are be monitored, then the number of comparator channels may be increased as necessary, remembering that each comparator unit has two usable channels. When more than one unit is employed, the outputs on terminal 4 must all be connected together; only one terminating resistor 20 is needed regardless of how many comparator channels are utilized. The coincidence circuit output configuration makes "stacking" possible. Should any one signal out of the many that are being monitored degrade below a certain preset limit, then the output will be in the "fail" state.

As illustrated in the drawing, the network is coupled with an amplifier system 3, the output 23 of which may be connected with any suitable alarm system of the visual or audible type whereby an instantaneous indication of a degradation of any input signal to the network 2 as derived from the output terminal 4 will be given so that the apparatus from which the input signal has been derived may be disconnected or de-energized prior to complete failure of the apparatus due to the malfunction.

The terminal output at terminal 4 is normally coupled into the amplifier 3 so that the signal corresponding to malfunction may be increased by a factor of one hundred or more; this tends to make for more reliable operation of an alarm system by establishing a large differential between operate and malfunction modes of the apparatus under test. Amplifier 3 is so designed that a preselected negative swing at the grid 24 on the order of one volt causes a plate swing in tube 25 of approximately 120 volts, and thus the positive going crossing of one hundred volts at the plate will represent the amplified failure level. A voltage-sensitive alarm 33 coupled to output 23 will be activated whenever the voltage increases above 100 volts. The plate of tube 25 is coupled through a resistor capacitor network 26 to a source of supply indicated as 250 volts in the drawing. The resistor 27 is of such a value as to cause the plate voltage thereof to fall below one hundred volts when the tube is conducting. It is to be further noted that the cathode 28 of tube 25 is coupled to ground at terminal 7. Should the comparator network 2 be removed from a socket in plug-in board 1, the plate current will be interrupted, and the voltage on the plate of tube 25 will rise above 100 volts and a failure alarm is activated at the terminal 23. A large differential between failure and normal is desirable to help prevent "false alarms." The inclusion of the amplifier 3 is not essential to the use of the comparator 2 as a device to detect failure. The output at terminal 4 may be used to directly actuate a simple alarm. The output may also be used to drive different amplifier configurations and to activate complex alarm systems. The interlocked protection provided by the jumper 31 between terminals 7 and 8 may also be utilized in different configurations.

The use of these detector channels in the comparator network as circuit performance monitors is quite feasible for cases where the circuits are packaged into easily replaced plug-in modules as are common in the electronic field. In a typical replaceable module there may be ten tubes, fifty resistors, twenty capacitors, and twenty-five diodes all of which can be monitored by a system such as described in the present invention. Modules that are part of systems where signal flow is periodic have certain key wave forms that repeat themselves as multiples of the signal period. It is possible, therefore, by knowing the state of certain key wave forms to know the state or performance level of the whole module. Once these certain key wave forms have been selected the next step is to determine by calculation and experimental verification the values of reference bias voltages needed to trigger the alarm if any of the key wave forms fall below the preset level indicating a malfunction. If, for example, a given wave form has a percent amplitude safety margin over normal operating requirements, then a typical failure level may be set at about 10% decrease in amplitude, thus assuring activation of an alarm connected to the output terminal 23 before the safety margin is depleted.

In a typical module under test, the necessary critical wave forms are coupled into the network 2 and their values of reference voltage are derived from an external divider not shown. By adjusting these externally derived biases, the alarm connected to terminal 23 may be designed to trip at any desired level. The number of networks necessary to monitor a given module is a function of the complexity of the module.

The description of the system has stressed the ability of the network 2 to detect decreases in amplitude of one or more input signals through plural channels 11 and 12. It should be noted that complete or catastrophic failure of one or more of the input signals will, of course, produce a very large negative output voltage since either condenser 15 or 32 will be completely uncharged, and the output will essentially be the value of the negative reference voltage. One of the big advantages of this network is its ability to convert one volt amplitude variation of input signal into a change in output state from normal to malfunction. By detecting gradual or marginal deterioration, modules can be removed from equipment before they reach the point of total failure and system malfunction. In this way the system is kept in peak condition and the maintenance workload is considerably eased. The fail safe feature of the system is very important to an alarm device of this type. Consider the following fail safe features. If condenser 13 should open, if the diode 29 should open or short, if resistor 14 should open or short, if the diode 30 should open or short, the condenser 15 will not be charged to its proper value, and the output will be at the value of negative bias or at failure. If resistors 16 or 17 or the diodes 18 or 19 should short, then failure would also register. However, if resistors 16 or 17 or diodes 18 or 19 should open up, the device would not fail safe, hence the reason for the parallel combinations. In other words, the device will work with only one each of resistors 16 and 17, or diodes 18 and 19 in operation. Since the development of this system more advanced logical external circuits to this system have been developed to monitor the performance of the pair of or combination of resistor diodes, thus always assuring one good resistor and good diode, thus completing fail safe protection. In the absence of these external circuits, the chances of failure of both elements of a pair is so remote that they may be considered to fail safe.

Thus it will become obvious to one skilled in the art that this comparator network will accept one or more input signals having periodic wave forms and will compare each input signal against its own externally supplied negative reference voltage and will normalize the comparison of the input signal and the reference. The network further supplies an output in essentially binary form, that is zero volts for normal and minus one volt for malfunction. Furthermore, the output levels are independent of input wave shapes. By using as many devices of this type as necessary, the performance state of complex electronic devices, sub-assemblies or systems may be reduced to a single A.C. voltage output.

I claim:

1. A comparator network comprising an alternating input signal, a steady reference signal, means adding the positive and negative going excursions of said input and reference signal producing a D.C. restored alternating signal, means detecting when the absolute magnitude of a peak excursion of said D.C. restored alternating signal just exceeds the absolute magnitude of said steady reference signal and means responsive to said detecting means for controlling an indicator.

2. A comparator network comprising an alternating input signal, a D.C. reference signal of given polarity, means for adding the positive and negative going excursions of said input signals to said reference signal means for detecting when excursions of said added signal fail to cross zero potential and means coupled to said detecting means for energizing an indicator warning when said input signal excursions fall below the absolute magnitude of said reference signal.

3. A comparator network comprising an alternating input signal, a D.C. reference signal, means restoring said input signal to the level of said reference signal producing a D.C. restored alternating signal, means including storage circuit of relatively long time constant for detecting when excursions of said D.C. restored alternating signal fails to cross zero potential, unidirectionally conductive means coupling said circuit to the input of an amplifier biased beyond cutoff when said failure occurs and indicating means coupled to the output of said amplifier.

4. A system for monitoring an alternating input signal comprising a source of D.C. reference signal, means for restoring said alternating signal to the level of said reference signal, indicating means, means including unidirectional conductive devices for controlling said indicating means, a storage circuit for controlling the biasing of said devices, and means coupling said restored signal to said storage circuit whereby said indicating means indicates the relative magnitudes of said alternating and reference signals.

5. A system for monitoring an alternating input signal comprising a source of D.C. reference signal, means for restoring said alternating signal to the level of said reference signal, indicating means, means including unidirectional conductive devices for energizing said indicating means when the direction of biasing of said devices changes, a storage circuit for controlling the biasing of said unidirectional conductive devices, and means coupling said restored signal to said storage circuit.

6. A system for monitoring an alternating input signal comprising a source of D.C. reference signal, means for restoring said alternating signal to the level of said reference signal, an electron discharge device, means including unidirectional conductive devices for controlling the output of said electron discharge device, a storage circuit responsive to said restored signal for controlling the biasing of said unidirectional conductive devices causing said unidirectional devices to conduct when peak excursions of said alternating signal exceed the magnitude of said reference signal.

7. A system for monitoring an alternating input signal comprising a source of D.C. reference signal of given polarity, means for restoring said alternating signal to the level of said reference signal, an electron discharge device, means including unidirectional conductive devices for controlling the output of said electron discharge device, a storage circuit responsive to said restored signal for controlling the biasing of said unidirectional conductive devices causing said unidirectional devices to conduct when peaks of said restored signal are of a polarity opposite said given polarity.

8. A system for monitoring a plurality of different alternating signals comprising a source of a plurality of D.C. reference signals each associated with a different one of said alternating signals; a plurality of similar circuits each responsive to a different one of said reference signals and each including means for detecting a different one of said alternating signals, means for restoring said detected alternating signal to the level of said associated D.C. reference signal, a storage circuit, and means coupling said restored alternating signal to said circuit; said system further including indicating means controlled by a biasing circuit including a plurality of groups of unidirectional conductive devices, and means coupling each of said groups of unidirectional conductive devices to a different one of said storage circuits.

9. A system for monitoring a plurality of different alternating signals comprising a source of a plurality of D.C. reference signals each associated with a different one of said alternating signals; a plurality of similar circuits each including means for detecting a different one of said alternating signals, means for restoring said detected alternating signal to the level of said associated D.C. reference signal, a circuit of relatively long time constant compared to the period of said detected alternating signal, and means coupling said restored alternating signal to said circuit; said system further including indicating means; a circuit including a plurality of groups of unidirectional conductive devices for energizing said indicating means when any of said groups of devices fail to conduct; and means coupling each of said groups of unidirectional conductive devices to a different one of said storage circuits.

10. A comparator network comprising:
at least a pair of circuits, each having means for coupling thereto an alternating input signal and a steady reference signal of given polarity, means for restoring said input signal to the level of said reference signal, and means coupled to said restoring means for detecting when at least a part of the excursions of said restored input signal are of a polarity opposite said given polarity and the absolute magnitude of said part is less than the absolute magnitude of said reference signal; and an "AND" coincidence circuit coupled to each of said pair of circuits for providing an output signal when the peak amplitude of either of said alternating input signals falls below a predetermined value.

11. A comparator network comprising:
at least a pair of circuits, each having means for coupling thereto an alternating input signal and a steady state negative reference signal, means restoring said input signal to the level of said reference signal producing a D.C. restored alternating signal, means detecting when the peak amplitude of said D.C. restored alternating signal exceeds zero potential by an amount of absolute magnitude less than the absolute magnitude of said reference signal; and an "AND" coincidence circuit coupled to each of said pair of circuits for providing an output signal when the peak amplitude of either of said alternating input signals falls below a predetermined value.

12. A fail safe comparator network system for continuously monitoring a plurality of input signals derived from a plural-circuited electronic device which comprises a plurality of channels, each said channel being adapted to receive an individual input signal from said device, a separate reference voltage means connected with each said channel, means to A.C. couple each said input signal into a separate channel of said network, each channel including diode means to restore the level of the A.C. coupled input signal therein to the value of the reference voltage applied thereto, separate condenser means connected across each said channel to ground to detect differentials between the peak amplitude of the input signal and the reference signal therein, means to interconnect said condenser means for each said channel into a common output network having a single output terminal, means in said common output network to prevent transmission of any voltage to said output terminal below a preset differential level as determined by any of said condenser means, and means to place a potential on the output terminal in response to the deviation or degradation of the amplitude of any input signal below a preselected amount with reference to its reference voltage amplitude.

13. The invention according to claim 12 wherein amplifying means are connected with said output terminal to condition an amplified output for indicating or actuating an alarm system associated with said network.

References Cited in the file of this patent
UNITED STATES PATENTS

| | | |
|---|---|---|
| 2,411,848 | Camras | Dec. 3, 1946 |
| 2,782,404 | Bergman | Feb. 19, 1957 |
| 2,849,606 | Parker et al. | Aug. 26, 1958 |
| 2,882,522 | Pearlman | Apr. 14, 1959 |
| 2,888,645 | Hoft et al. | May 26, 1959 |
| 2,956,268 | Kline | Oct. 11, 1960 |
| 2,982,887 | Seeley | May 2, 1961 |
| 3,072,895 | Kaufman | Jan. 8, 1963 |